Nov. 8, 1938.   A. E. ROTH   2,135,603
PIGEON TRAP
Filed Oct. 12, 1936   4 Sheets-Sheet 1

INVENTOR.
Arthur E. Roth
BY
Thomas D. Lone
ATTORNEY.

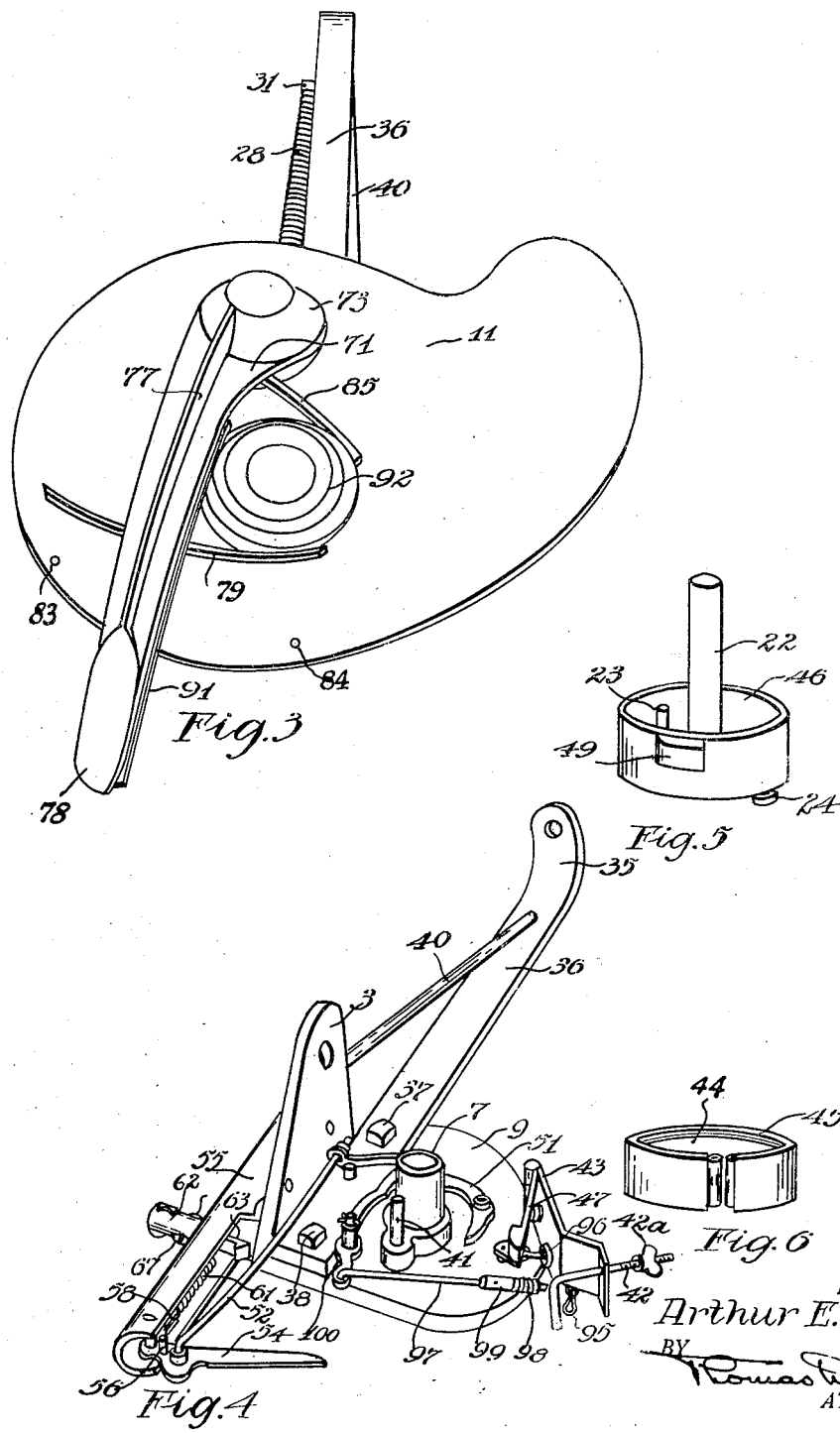

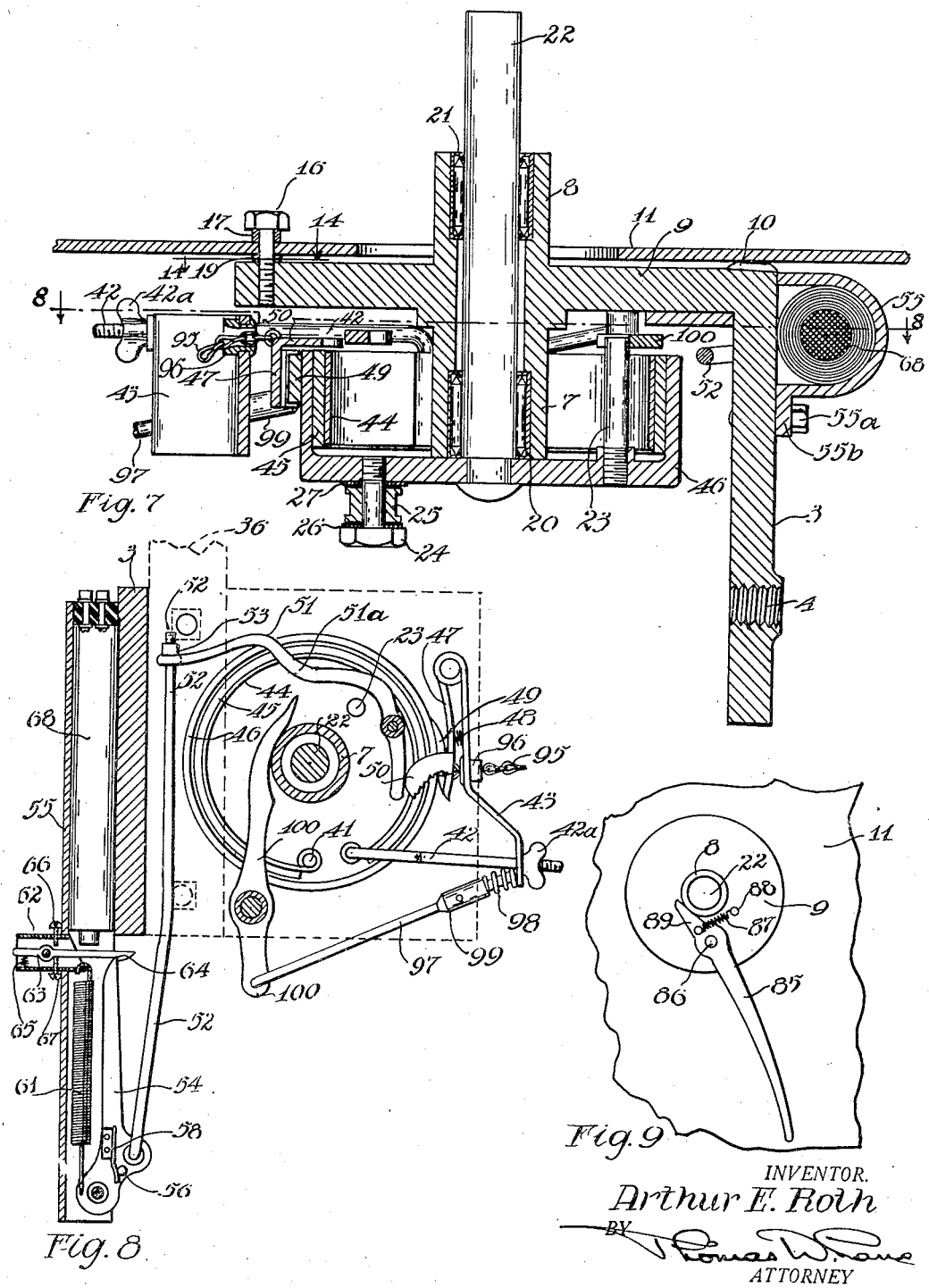

Nov. 8, 1938.　　　A. E. ROTH　　　2,135,603
PIGEON TRAP
Filed Oct. 12, 1936　　　4 Sheets-Sheet 4

INVENTOR.
Arthur E. Roth
BY
Thomas D. Lane
ATTORNEY

Patented Nov. 8, 1938

2,135,603

UNITED STATES PATENT OFFICE 2,135,603

PIGEON TRAP

Arthur E. Roth, Prairie du Chien, Wis.

Application October 12, 1936, Serial No. 105,271

4 Claims. (Cl. 124—8)

The present invention relates to a target trap, and more particularly to a target trap for the throwing of clay pigeons for trap and skeet shooting and embodying some of the features set forth in my Patent No. 2,025,903.

An object of the present invention is to make an improved trap for the throwing of clay pigeons.

Another object is to make a trap having improved electrically actuated release means and manually actuated means so that the trap may be actuated either manually or electrically.

Another object is to make a trap having a pigeon retaining member to releasably hold a pigeon in resilient contact with a throwing arm.

Another object is to make a trap having a throwing arm with cooperating braking means to arrest the arm in a partially cocked position upon the completion of a throwing movement.

Another object is to make an adjustable table to provide necessary horizontal clearance between the table and the throwing arm.

A further object is to make a trap having a throwing arm curved to follow the trajectory of a pigeon as it leaves the trap.

In order to attain these objects there is provided, in accordance with one feature of the invention, a supporting table having a pivotally mounted throwing arm extending laterally in upwardly spaced relation from the surface of said table, the outer end of said throwing arm being curved downwardly in a parabolic curve corresponding to the trajectory of a pigeon on leaving the table with the table adjusted at a predetermined angle which is considered as "normal" for this purpose. A brake drum is mounted beneath the table and is connected to the throwing arm to rotate therewith, the brake drum having a cam operating element mounted to rotate therewith and a cam operated lever mounted to actuate a brake mechanism. A second cam operated lever is also mounted to be actuated by said cam operating element to set an electrically operated release mechanism upon each actuation of the throwing arm. The electrically operated release mechanism is mounted in conjunction with a throwing arm releasing device to operate said releasing device on an actuation of the electrical release mechanism, a manual releasing device being provided in connection with said releasing element to permit either electrical or manual operation as desired. A resiliently actuated finger is pivotally mounted on the upper surface of the table to engage a target to resiliently hold the target in engagement with the throwing arm when the trap is in a set position, the finger being moved to release the target on an actuation of the throwing arm.

These and other features of the invention will be more fully set forth in the following description and the accompanying drawings, wherein:

Figure 3 is a view similar to Figure 2 showing the throwing arm in fully cocked position.

Figure 4 is a view in perspective showing a table support and associated mechanism in inverted position a brake drum and brake band being removed to show the structure of the remaining mechanism.

Figure 5 is a view in perspective of a throwing arm support post and associated brake drum.

Figure 6 is a view in perspective of a brake band.

Figure 7 is a transverse sectional view taken substantially on the line 7—7 of Figure 1 with the throwing arm removed and the table support member removed from a supporting base.

Figure 8 is a sectional view taken substantially on the line 8—8 of Figure 7, the position of an overlying table support being indicated in dotted lines.

Figure 9 is a fragmentary view of a portion of the table surrounding the throwing arm support post with a resiliently actuated target engaging finger mounted thereon.

Figure 1:
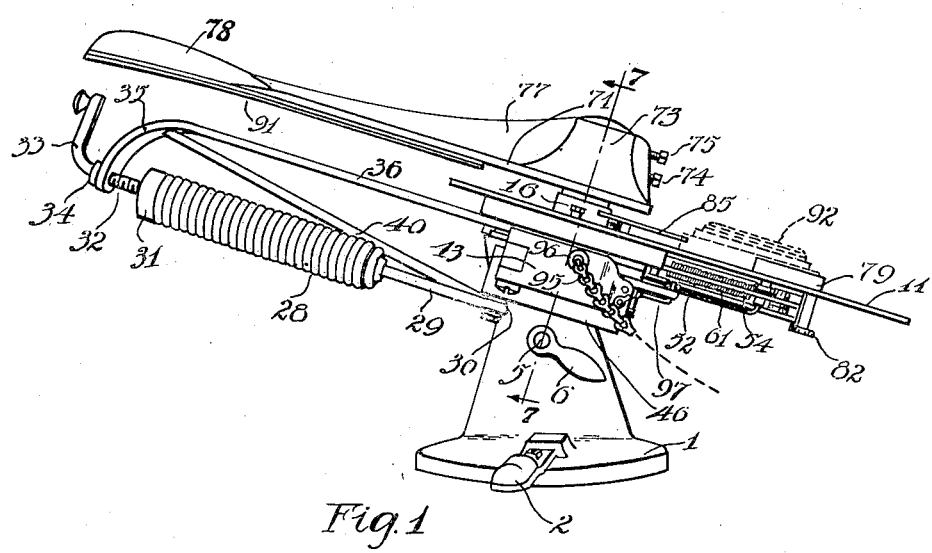
Figure 1 is a view in perspective showing a side view of a mechanism embodying the present invention, a clay pigeon being indicated in position thereon in dotted lines.

Referring to the drawings in detail the trap comprises a supporting base 1 having a laterally extending positioning handle 2 bolted thereto. The trap may be mounted on any suitable support such as a tripod similar to that shown in my Patent No. 2,025,903, or other convenient type of mount well known to the art.

Pivotally connected to the base 1 is a table support member 3 having a threaded opening 4, (see Figure 7) to threadedly receive a bolt 5 (see Figure 1) having an operating handle 6 fixedly connected thereto. The table support member 3 is preferably an angle shaped member of cast iron and is provided with bearing extensions 7 and 8 extending from the bottom and top surfaces respectively of a horizontally disposed portion 9 of the table support 3. A pair of raised bosses 10 are provided on the right hand side of the portion 9 of the table support 3 and an easel shaped table 11 is mounted on the horizontal portion 9 of the table support and is secured thereto by a pair of screws 12 and 13 (see Figure 2), which penetrate the table and are threadedly inserted in the bosses 10. The openings in the table to receive the screws 12 and 13 are of a size to freely receive said screws.

Figure 14:
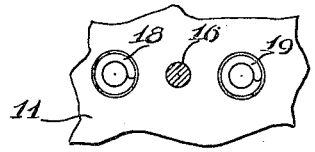
Figure 14 is a sectional view taken substantially on the line 14—14 of Figure 7 showing a table adjusting bolt and associated springs for adjusting the position of the table.

On the outer or free end of the portion 9 which is the left side as viewed in Figure 7, a bolt 16 penetrates the table 11 and is threadedly inserted in the portion 9 of the table support. A washer 17 is provided beneath the head of the bolt 16 to make the bolt more accessible to a wrench, not shown, by means of which the bolt 16 may be turned. A pair of coil springs 18 and 19 (see Figure 14) are mounted, one on each side of the bolt 16 in recesses drilled in the upper surface of the table support 9, to engage the lower surface of the table 11 to resiliently force the table upward against the washer 17.

A pair of needle type roller bearings 20 and 21 are mounted one in each end of the bearing extensions 7 and 8 respectively and a throwing arm support shaft 22 is pivotally mounted in these bearings. Securely affixed to the lower end of the throwing arm support shaft is a brake drum 46 having a cam operating post 23 fixedly mounted therein as by threading. A throwing spring connecting post mounted to extend downwardly from the lower face of the brake drum, comprises a bolt 24 having a sleeve 25 mounted to rotate thereon and having a pair of wear resisting washers 26 and 27 mounted one on each end of said sleeve. These washers are preferably of brass or bronze and sufficient clearance is provided to permit the sleeve 25 to rotate freely.

A throwing spring 28 (see particularly Figure 1) may be of the same general type as that shown in my Patent No. 2,025,903, and comprises a heavy coil spring 28 having a rod 29 extending from the rearward end thereof. This rod is provided with a hook shaped rear end portion 30 adapted to have hooked engagement with the sleeve 25. Securely affixed to the opposite end of the spring 28 is an internally threaded member 31. Threadedly inserted in this member 31 is a tension control screw 32 having an offset operating handle portion 33. A collar 34 is fixedly secured to the control screw 32 to rest against the outer face of a downwardly turned end portion 35 of a spring support arm 36 which is bolted to the lower face of the table support member 9 as by means of bolts 37 and 38 (see Figure 4). A radial brace rod 40 extends from the outer portion of the member 36 to the lower end of the vertical portion of the table support member 3 to brace the member 36 against the tension of the spring 28.

Figure 11:
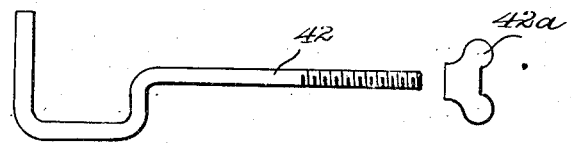
Figure 11 is a view in side elevation of a brake actuating rod with associated wing nut.

A brake band support post 41 (see Figures 4 and 8) is fixedly secured to extend downwardly from the lower face of the horizontal portion 9 of the table support. A brake operating rod 42 (see Figures 4 and 8 and 11 particularly) is mounted in the opposite end of a brake band 44 from the post 41, the rod 42 extending laterally and through an opening in a brake actuating lever 43 which is pivotally mounted on the lower face of the portion 9 of the table support member. The outer end of the brake actuating rod 42 is threaded, and a thumb screw 42a has threaded engagement therewith to adjust the position of the brake actuating rod 42 with respect to the lever 43. The brake band 44, shown in detail in Figure 6 and sectionally in Figure 7, is preferably of spring metal having the ends thereof curled inwardly to provide bearings for the post 41 and the rod 42. The outer surface of the band 44 is covered with suitable brake band material 45 and the normal position of the metal band 44 is such as to bring the brake band material free of the inner surface of the upstanding flange of the brake drum 46.

A push rod 97 is mounted with the outer end thereof inserted in an opening in the brake actuating lever 43. A heavy compression spring 98 is mounted to encircle the push rod 97 and is retained in position by a collar 99 affixed to the push rod. The inner end of the push rod is bent downwardly at right angles and pivotally engages the rearward end of a cam lever 100. The forward end of the lever 100 normally rests against the lower journal support 7 and is positioned to be engaged by the cam post 23 in the rotation of the brake drum 46 and associated parts to pivotally move the lever 100 in a counterclockwise direction from the position shown in Figure 8. This moves the rod 97 to the right forcing the lever 43 outwardly and drawing the rod 42 to the right from the position of Figure 8 to apply the brake to the interior of the brake drum 46.

Pivoted co-axially with the brake actuating lever 43 is a pawl 47 which is resiliently pressed by a spring 48, mounted between the brake actuating lever 43 and the pawl 47, into engagement with the periphery of the brake drum 46. Fixedly mounted on the periphery of the brake drum is a sear 49 positioned to be engaged by the pawl 47 when the spring support post 24 mounted on the bottom of the brake drum 46 is slightly past bottom dead center with respect to the pull of the throwing spring 28.

An inwardly projecting extension 50 is mounted on the free end of the pawl 47 to be engaged by a releasing lever 51 upon the operation of an electrically actuated releasing device. The opposite end of the lever 51 is provided with a horizontally disposed opening to freely receive a rod 52 which is provided with an adjusting nut 53 to adjust the position of the rod 52 and the lever 51 with respect to a trigger member 54, pivotally engaged by the rod 52. The central portion of the lever 51 is curved inwardly as at 51a to have cam engagement with the post 23 in the rotation of the drum 46.

Figure 10:
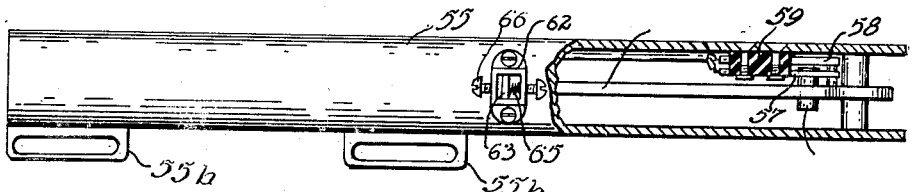
Figure 10 is a plan view of an electrical actuating device, a portion thereof being broken away to show the interior construction.

A contact post 56, preferably of brass, is mounted on the trigger to engage a pair of spring contact fingers 57 and 58, mounted on an insulative block 59 (see Figure 10) fixedly secured to the housing 55, when the trigger is in a set position as shown in Figure 8. When the trigger swings to an actuated position as shown in Figure 4 the post 56 swings outwardly out of engagement with the fingers 57 and 58. A coil spring 61 is held in tension between the trigger 54 and a latch housing 62 to resiliently urge the trigger to an outwardly swung position as shown in Figure 4.

Figure 13:
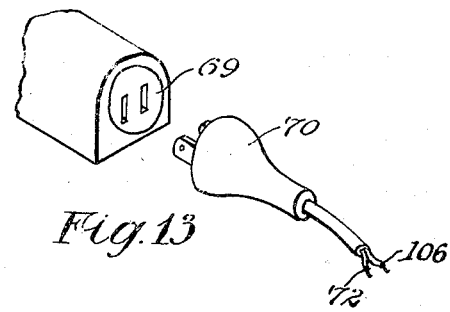
Figure 13 is a view in perspective of an end fragment of the electrical actuating device showing a connecting plug and a plug receptacle for completing the electrical circuit at this point.

Pivotally mounted in a latch housing 62 is a latch 63 of magnetically permeable metal having a notched inner end 64 to engage the trigger 54. A light coil spring 65 is held in compression between the latch 63 and a side of the latch housing to normally urge the latch into hooked engagement with the trigger 54. A pair of adjusting screws 66 and 67 are threadedly mounted in the latch housing, one on each side of the latch, to adjustably limit the throw of the latch. An electro-magnet 68 is mounted in the forward end of the housing 55 and a socketed receptacle 69 of a conventional type (see Figure 13) is provided in the forward end of the housing to receive an electrical contact plug 70 which electrically connects the device by means of conductors to an electrical actuating circuit.

A throwing arm 71 is preferably cast or stamped from a light metal such as aluminum and comprises a hub portion 73 adapted to receive the upper end of the shaft 22. This hub portion 73 is provided with a pair of threaded openings to receive a pair of set screws 74 and 75 by means of which the throwing arm is fixedly secured to the shaft 22. The throwing arm is formed with the forward edge thereof curved slightly forward and the arm is offset from the hub so that the forward edge of the arm if projected inwardly would pass substantially through the axis of the shaft 22.

The inner portion of the throwing arm is parallel to the top of the table 11, but from a point where the target, in the operation of the throwing arm, leaves the table, the arm curves downward slightly on a parabola equal to that taken by the target in flight from a predetermined normal angle of the trap table. Since gravity deflects the target immediately upon leaving the table, this curvature can be accurately calculated upon finding the speed at which the target leaves the table top and the deflection caused by gravity for the particular angle setting of the table selected as "normal." A vertical reinforcing fin 77 extends longitudinally along the upper surface of the throwing arm from the hub 73 to a hand grip portion 78 at the outer end of the throwing arm. A rubber strip 91 is secured to the lower face of the throwing arm and projects forwardly slightly therefrom to form a resilient target engaging element.

Figure 2:
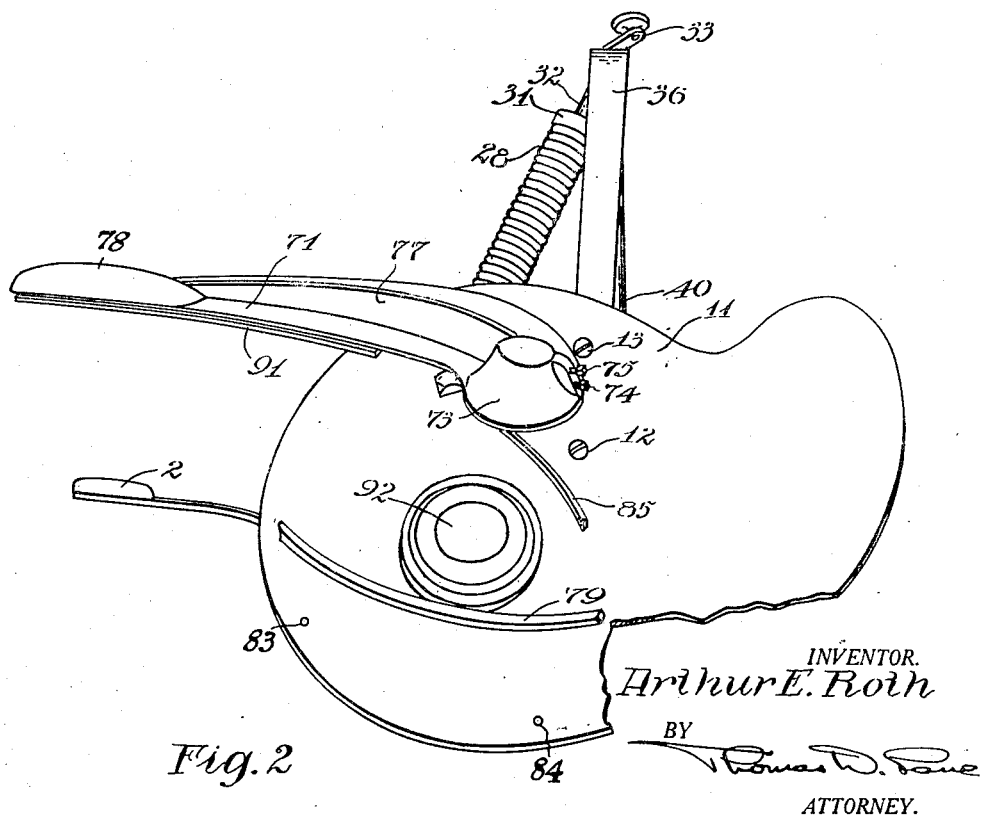
Figure 2 is a a view in perspective showing a rear view of the device illustrated in Figure 1 and shows the trap table in an up-tilted position, a target being indicated in position thereon and the throwing arm being illustrated in a partially cocked position as it appears upon the completion of a throwing operation.
Figure 15:
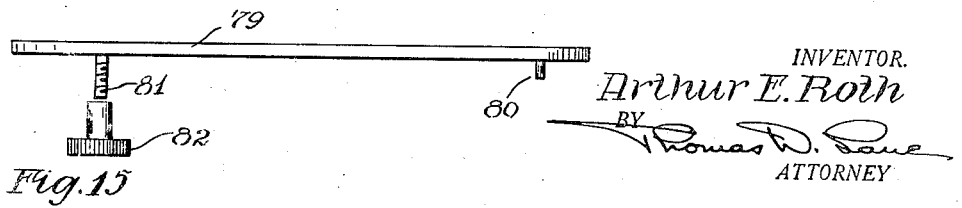
Figure 15 is a view in side elevation of a target positioning strip and associated knurled securing nut.

A target positioning strip 79 (see Figure 15) is provided with a pin 80 at one end and a threaded post 81 at the other, extending downwardly and adapted to be inserted in either of two pairs of holes drilled in the table 11 to receive them. A threaded knurled nut 82 is adapted to be screwed onto the post 81 to secure the strip in position on the table. When the strip 79 is mounted with the pin 80 and the screw 81 in the upper pair of holes as shown in Figures 1, 2, and 3, the trap is adapted to throw single birds and when mounted in the lower set of holes 83 and 84 the trap is adapted to throw doubles as set forth in my Patent No. 2,025,903.

A target retaining finger (see Figure 9) comprises a lever 85 pivotally mounted on a post 86 projecting vertically from the upper face of the portion 9 of the table support member. A light spring 87 is held in tension between the lever 85 and a pin 88 mounted in the portion 9 of the table support. A forwardly projecting portion 89 of the lever 85 is adapted to engage the journal support 8 to limit the pivotal movement of the lever 85 in a clockwise direction under the tension of the spring 87.

Figure 12:
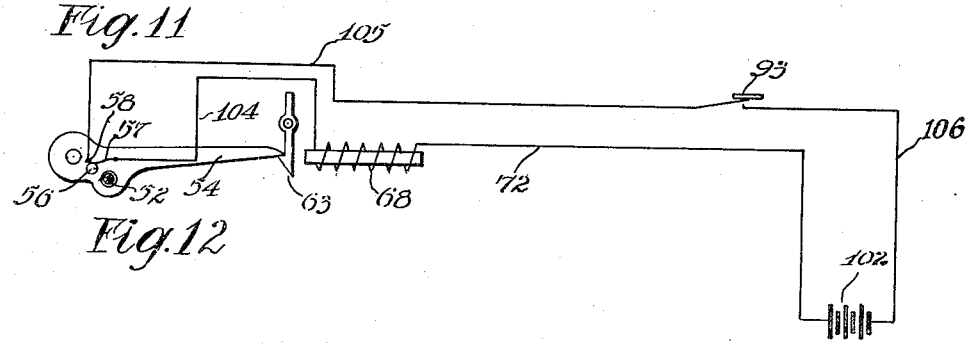
Figure 12 is a schematic drawing of the electrical circuit employed in actuating the electrical releasing mechanism.

An electrical circuit for electrically releasing the trap is schematically illustrated in Figure 12. An electric battery 102 or other source of suitable electric current is connected by means of a conductor 72 to one end of the winding of the electro-magnet 68. From the other end of the winding a conductor 104 is connected to one of the spring contact fingers 57. From the other contact finger 58 a conductor 105 is connected to one terminal of the switch key 93. From the other terminal of the switch key a conductor 106 is connected to the other terminal of the battery. When the trigger 54 is in the set position the post 56 electrically connects the fingers 57 and 58 so that upon closing the switch key 93 a circuit is completed through the winding of the electro-magnet 68.

The operation of the device is as follows: Assuming that the trap is for throwing singles the table is adjusted to the proper angle by loosening screw 5 by means of handle 6 to free the table for tilting and adjusting in proper position. Screw 5 is tightened to draw the table support 3 in to a tight frictional engagement with the base 1. The target support strip 79 is placed in the upper set of holes as shown in Figures 1, 2, and 3 and a target 92 is placed in position as shown in Figures 1 and 2.

Assuming that the throwing arm 71 is in the forward position as shown in Figure 1, the arm is manually grasped by the grip portion 78 and is drawn down to the position shown in Figure 2 at which point the brake band 45 is in braking engagement with the drum 46. The operator continues to move the arm downwardly, overcoming the resistance of the brake until the throwing arm reaches the lowermost of cocked position of Figure 3. This moves the target 92 forward to be resiliently engaged by the positioning finger 85 as shown in Figure 3. In this position the post 24 on the brake drum is slightly past bottom dead center with respect to the throwing spring 28, as the throwing arm is moved from the position shown in Figure 1 to the set position shown in Figure 3. In this initial setting of the trap the cam actuating post 23, riding against the inwardly curved portion 51a of the lever 51 forces the lever outward, pulling the rod 52 connected to the trigger 54 forward thereby swinging the trigger 54 into hooked engagement with the latch 63.

Also during this initial setting of the throwing arm the cam actuating post 23 moves counter clockwise from the position shown in Figure 8, engaging the cam lever 100 and swinging it in a counterclockwise direction thereby forcing the push rod 97 outwardly or to the right from the position shown in Figure 8. This action draws the brake actuating rod 42 outwardly applying the brake 45 to the inner surface of the brake drum 46. For this initial setting of the trap it is necessary to use considerable manual force to set the trap.

With the arm in the set position shown in Figure 3, the operator may if he so desire, place a second pigeon not illustrated in back of the throwing arm and this procedure is preferred since it leaves the second target in position for a second throwing operation. The trap being set, to actuate the trap it is merely necessary to close the electric circuit (illustrated in Figure 12) as by means of the key 93, thereby causing a flow of current through the electro-magnet 68. This draws the electrically permeable latch 63 out of hooked engagement with trigger 54 which thereupon is swung outward to the position shown in Figure 4 by means of the spring 61. This draws the rod 52 rearwardly and swings the arm 51 in a counter-clockwise direction from the position shown in Figure 8 thereby forcing the pawl 47 outwardly out of hooked engagement with the sear 49.

The throwing arm spring 28 thereupon forcibly rotates the brake drum 46 and throwing arm shaft 22 and the throwing arm 71 in a counter-clockwise direction from that illustrated in Figure 3, thereby throwing the target from the trap in a well known manner. As the target leaves the table it is still in contact with the throwing arm. At this point the throwing arm curves downwardly in a parabola to follow the flight path of the target, causing the rubber target engaging strip 91 to remain in contact with the target in its original plane which makes for a smoothly rotating target. The arm continues to swing past top dead center to bring the throwing arm to rest in the position illustrated in Figure 2. The brake is adjusted by means of the thumb screw 42a so that the throwing arm comes to rest slightly before the cam post 23 releases the brake cam lever 100 and therefore requires only a short easy movement of the throwing arm by the operator to bring the throwing arm 71 downwardly to the set position shown in Figure 3. During this movement of the throwing arm 71 from the position illustrated in Figure 2 to the set position in Figure 3 the cam engaging post 23 is brought into engagement with the cam lever 51 to reset the trigger 54. The resetting of the trigger in this manner during the manual movement of the arm 71 accomplishes the resetting of the trigger in slow motion thereby greatly reducing the strain and wear on the parts which would be present if the resetting were accomplished while the throwing arm was in motion under the impetus of the spring 28.

This carries the second target originally placed behind the throwing arm forwardly into the position shown in Figure 3, when the trap is again ready for operation. At this time the operator places another target in back of the throwing arm and the cycle of operation may be repeated indefinitely. Adjustment of the electrically actuated release mechanism is provided by means of bolts 55a (see Figure 7) which are inserted in slots in ears 55b (see Figure 10) of the housing 55 to permit longitudinal adjustment of the housing 55 and its associated parts.

To manually actuate the trap a chain 95 is secured to the pawl 47. The chain passes through an eyelet 96 in the brake actuating lever 43 and is carried to a point where it may be manually pulled by an operator in any direction.

The present trap is easily adjusted to throw targets in any direction, from a line almost vertical to well below horizontal and at any angle within a complete 360 degree circle. The operation of the trap is smooth and rapid and the targets fly in a true path without wobble particularly when the trap table is adjusted to approximately its normal angle as previously described. The finger 85 by holding the targets against the throwing arm reduces the breakage of sound targets to nil.

I claim:

1. A target trap having a target support table, a spring actuated throwing arm pivotally mounted to swing in a plane parallel to the top surface of said table, said throwing arm being of a length to remain in an engagement with a target after said target leaves the table during the throwing operation, the portion of the throwing arm thus remaining in engagement with said target being curved down in a curve substantially equal to the trajectory of the target when the table is positioned at a predetermined throwing angle, acute to a vertical line through the trap.

2. A target trap having a target support table, a spring actuated throwing arm pivotally mounted to swing in a plane parallel to the top surface of said table, a pivotal portion of said throwing arm being rotatably mounted in a table element and extending downwardly below the lower surface thereof, a brake drum fixedly secured to said pivotal element to rotate therewith, a brake mechanism mounted adjacent said brake drum and movable into braking engagement with said drum, a cam actuating element fixedly secured to said brake drum, a pair of levers each having a cam surface thereon engageable by said cam actuating element in sequence during a rotation of said drum; an electrically actuated trigger operatively connected to the first of said levers to be engaged by said cam actuated element to be reset by an actuation of said lever by said cam actuating element and brake actuating means operatively connected to the second of said levers to be engaged by said cam actuating element to operate said brake mechanism to arrest said throwing arm in a partially set position at the completion of a throwing movement of said arm.

3. A target trap having a target support table, a throwing arm mounted to swing in a plane substantially parallel to the top of said table, a brake drum fixedly mounted with respect to said throwing arm to rotate therewith, braking means operatively associated with said brake drum to be actuated at a predetermined point in the operation of said throwing arm, a sear fixedly secured to said brake drum, a pawl pivotally mounted with respect to said table and adapted to engage said sear to retain said throwing arm in a set position, an electrically actuated trigger operatively connected to said pawl to release said pawl from engagement with said sear on an actuation of said trigger, and a cam mechanism operated by a rotation of said throwing arm to reset said trigger upon completion of a manual pull of said throwing arm.

4. A target trap having a target support table, a spring actuated throwing arm pivotally mounted to swing in a plane parallel to the top surface of said table, brake means operatively associated with said throwing arm, a cam actuating element mounted to rotate with said throwing arm, a pair of levers each having a cam surface thereon engageable by said cam actuating element in sequence during a rotation of said drum, a trigger operatively connected to one of said levers to be engaged by said cam actuating element to be reset by an actuation of said lever by said cam actuating element, and brake actuating means operatively connected to the second of said levers to be engaged by said cam actuating element to operate said brake means to arrest said throwing arm after the completion of a throwing movement of said arm.

ARTHUR E. ROTH.